D. F. YOUNGBLOOD.
PORTABLE CONVICT CAGE.
APPLICATION FILED JAN. 23, 1909.
922,993.
Patented May 25, 1909.
2 SHEETS—SHEET 1.
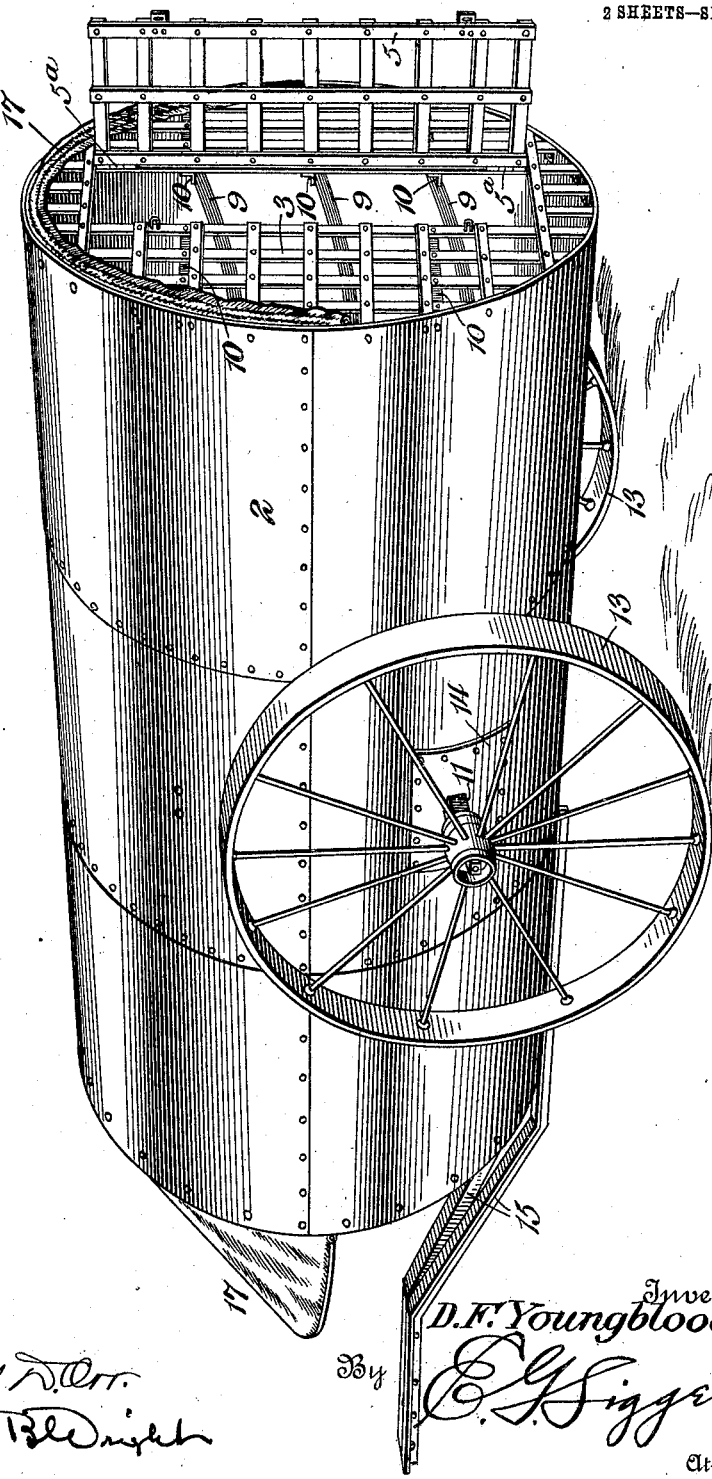

D. F. YOUNGBLOOD.
PORTABLE CONVICT CAGE.
APPLICATION FILED JAN. 23, 1909.
922,993.
Patented May 25, 1909.
2 SHEETS—SHEET 2.
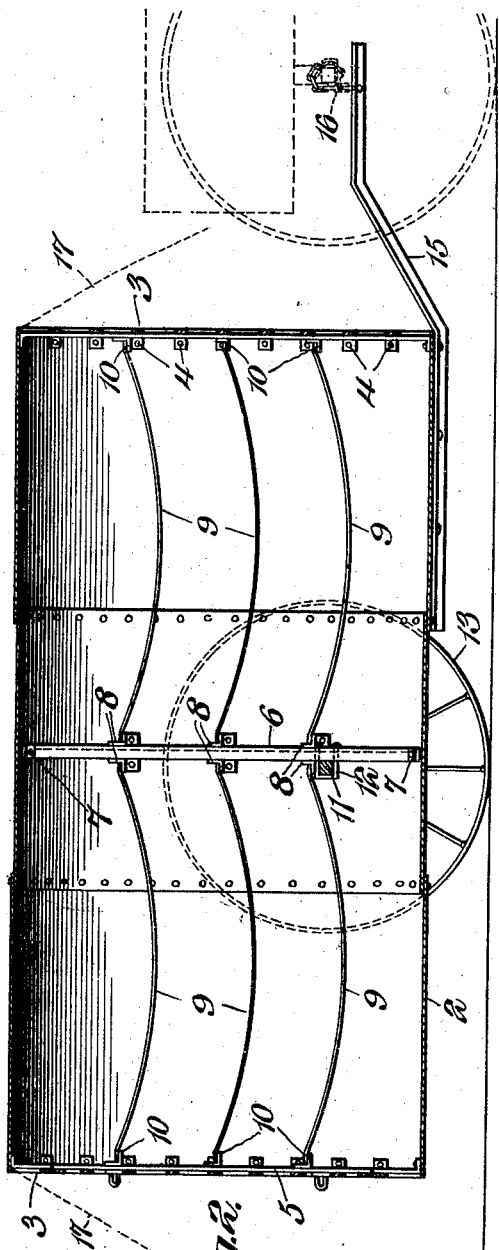
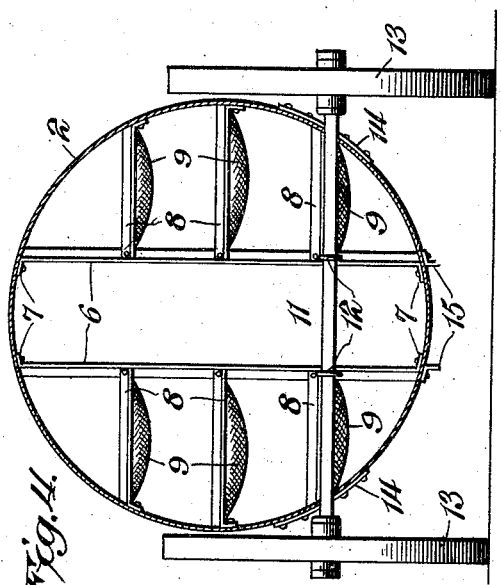
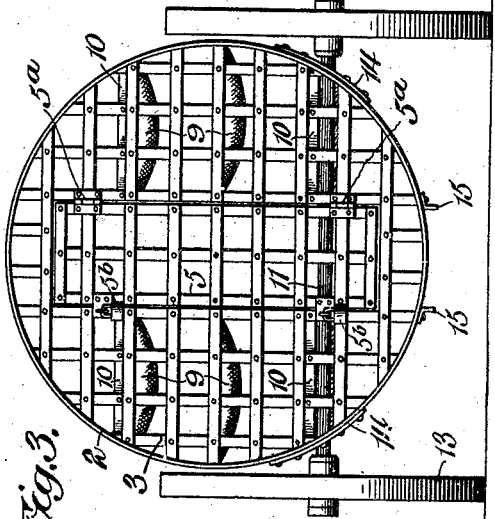
D. F. Youngblood,
Inventor,

UNITED STATES PATENT OFFICE.

DAVID FRANKLIN YOUNGBLOOD, OF SAN ANTONIO, TEXAS.

PORTABLE CONVICT-CAGE.

No. 922,993.  Specification of Letters Patent.  Patented May 25, 1909.

Application filed January 23, 1909. Serial No. 473,920.

*To all whom it may concern:*

Be it known that I, DAVID FRANKLIN YOUNGBLOOD, a citizen of the United States, residing at San Antonio, in the county of Bexar and State of Texas, have invented a new and useful Portable Convict-Cage, of which the following is a specification.

My invention has especial relation to a portable structure for the housing and transportation of malefactors, such as are used in certain portions of the country where gangs of convicts are sent out along the roads for days at a time to work on the highways or execute public works of like character. Difficulty is experienced under these circumstances in properly housing and guarding these convicts, providing sleeping arrangements therefor, and otherwise guarding both from attempts to escape and from attacks on the part of outsiders.

My invention has for its main object the provision of a convict cage or metallic structure which shall have a maximum of strength and containing capacity, with a minimum of weight and size, which, by reason of its shape, shall offer great resistance to attacks either from the outside or inside, which is capable of easy transportation through difficult country and over bad roads, and which shall afford accommodations for a number of felons.

Other objects are to provide for a perfect ventilation of the structure and provide means which shall act not only to entirely brace the same, but act also as a support for the bunks or hammocks upon which the convicts shall sleep.

A cylindrical structure for this purpose has several advantages over one of any other shape. A cylindrical structure is most difficult to attack, and, furthermore, its contour tends to glance off any projectile which may be fired at it. Further, a cylindrical structure provides for a central passage of maximum height and with a bunk space on both sides of the passage, and, further, the cylindrical form acts to prevent the collection of water upon the top of the cage and thus makes the structure longer lived and less liable to have the joints of the metal become rusted and thereby weakened. This cylindrical structure I leave open at both ends, but protect the ends by introducing bars forming a latticework which is fastened to the cylinder on the inside. This latticework permits the easy passage of air to the interior of the cage, while efficiently acting to close the ends. Wheels are also provided and attached to the cylinder whereby it may be moved from place to place.

In the drawings, Figure 1 is a perspective view of a convict cage constructed in accordance with my invention; Fig. 2 is a longitudinal diametrical section thereof on a reduced scale; Fig. 3 is a rear end elevation; Fig. 4 is a transverse section just in rear of the wheels.

In the drawings, 2 denotes a sheet metal cylinder which may be formed in one piece, or in sections, and connected in any desired manner. The cylinder is open at its ends and there provided with gratings, 3, of any suitable character, the intersecting bars of which are riveted or otherwise attached to the cylinder. I have shown the bars as flat bars, having their ends inwardly bent or angled as at 4, and riveted to the cylinder, these bars being, of course, riveted to each other. While this provides a thoroughly efficient grating, I do not wish to be limited thereto, as it is obvious that I might use any form of grating or lattice desired without departing from the spirit of my invention.

The central portion of the rear lattice is provided with a lattice door, 5, hinged as at $5^a$, and provided with any desired locking arrangement, $5^b$, ordinary padlocks being shown for this purpose. The front grating 3 is not formed with any door, the latticework extending entirely across the cylinder from one side to the other. At its middle, as shown in Fig. 4, the cylinder is braced by two spaced vertical standards 6, of angle-iron having their ends angled or turned as at 7 and riveted to the cylinder. It will be seen that these standards brace and support the middle of the cylinder and prevent any deformation of the cylinder under strain. Riveted to the standard 6 and to the adjacent wall of the cylinder are the horizontal angle-irons 8, which form supports for hammocks, 9. These hammocks are preferably of webbing and are attached at their ends to the angle-irons 8 and to angle-irons 10 which are riveted or bolted to the interior of the grating 3. While I may mount this cylinder upon wheels arranged in any desired manner, I preferably support the cylinder upon a pair of wheels having an axle passing through the middle of the cylinder. As shown in Fig. 4, the axle, 11, at its central portion is held rigidly to the standards 6 by U-bolts, 12, the axle being preferably square so that it will have a solid and non-rotative engagement with the U-bolts. This is the simplest construction and I have found it efficient in practice. Thus it is obvious that the central portion of the axle might be depressed in order to prevent any obstruction to the central gangway. The ends of the axle are, of course, provided with wheels, 13. In order to reinforce the cylinder at the points where the axle 11 protrudes therethrough, I provide the reinforcing plates, 14, which are riveted to the outside of the cylinder, thus giving a double thickness of metal at these points and preventing the cylinder wall being broken or indented by the movement of the axle therein.

At its forward end the cage is provided with a tongue formed preferably of two spaced angle-irons, 15, as shown, riveted to the bottom of the forward end of the cylinder and then extended upward and forward in such position that they may be readily attached to the rear axle of an ordinary wagon as shown in dotted lines in Fig. 2, the downwardly depending contacting flanges of the angle irons, 15, being riveted together and provided with holes for the passage of a chain, 16, or other connection provided for this purpose.

Inasmuch as the ends of the cylinder are open it is necessary to provide means for preventing the entrance of rain therethrough. To this end I provide the awnings, 17, which should be arranged so as to obstruct as little as possible the latticework, 3, when the awnings are raised, and yet give as much protection as possible to the end of the cylinder when the awnings are lowered.

I have found by practical use that cages constructed upon the principles above described are exceedingly convenient, very strong, very weatherproof and easily transportable. The placing of the wheels in the middle of the cylinder permits the cylinder to be moved much more easily than it would be if four wheels were used, and this is particularly the case where the cylinder is being transported over rough and uneven ground or partially cleared fields. The use of the two wheels permits the cylinder to be readily turned to round corners and to accommodate itself to situations almost impossible with a four-wheeled vehicle. Of course, when the structure has reached its destination, the ends of the cage are to be blocked up or otherwise supported.

In service I have found that the cage above described will house convicts with a great degree of comfort to themselves and with a very high degree of security. The principal advantage of my invention, however, lies in its ability to resist attack, its natural strength and its carrying capacity in proportion to its size.

Having thus described my invention, what I claim as new and desire to secure by Letters-Patent, is:

1. A convict cage comprising a metallic cylinder having wheels on which it is horizontally supported, and a grating closing each end of the cylinder and providing means by which said cylinder may be ventilated.

2. A convict cage consisting of a metallic cylinder having wheels upon which it is horizontally supported, and a grating closing one end of the cylinder.

3. A convict cage consisting of a metallic cylinder having wheels upon which it is horizontally supported, and a grating closing one end of the cylinder and having its bars riveted to the inside of said cylinder.

4. A convict cage comprising a metallic cylinder horizontally supported upon wheels, gratings closing the opposite ends of the cylinder, vertical standards located within the cylinder and spaced apart to form an intermediate gangway, said standards being secured at their ends to the inside of the cylinder, and transverse bars extending from said standards to the adjacent inner face of the cylinder and secured to said standards and the inside face of the cylinder.

5. A convict cage consisting of a metal cylinder, and a grating closing the end of the cylinder, said grating being provided with a door.

6. A convict cylinder consisting of a metal cylinder having gratings closing both ends of the cylinder, one of the gratings being provided with a door.

7. A convict cage consisting of a metal cylinder, the end of the cylinder being closed by a grating formed of intersecting bars, said bars being provided with inwardly turned ends riveted to the inside of the cylinder.

8. A convict cage consisting of a metal cylinder horizontally supported and having vertical braces interiorly of the structure, spaced apart from each other and forming supports for webbing.

9. A convict cage comprising a metal cylinder horizontally supported having grated end portions, the interior of the cylinder being provided with a plurality of hammocks or bunks.

10. A convict cage consisting of a metal cylinder, gratings closing the ends of the cylinder, and hammocks or bunks supported on the interior of the cylinder on both sides of a central gangway.

11. A convict cage comprising a metal cylinder horizontally supported, gratings closing the opposite ends of the cylinder, vertical standards located at the middle of the cylinder and spaced apart to form an intermediate gangway, transverse bars connected from said standards to the adjacent face of the cylinder, and webbing supported upon said bars at one end and upon said gratings at the other.

12. A convict cage comprising a cylinder of metal having a pair of wheels attached to the cylinder midway between its ends.

13. A convict cage comprising a metal cylinder having wheels midway between its ends upon which the cylinder is supported, the forward end of the cylinder being provided with an outwardly projecting tongue adapted to be connected to a wagon.

14. A cylindrical metallic convict cage, an axle passing transversely through the cage midway between its ends, and wheels upon the axle.

15. A cylindrical metal convict cage having an axle passing transversely through the cylinder midway between its ends, wheels carried by the axle, and reinforcing plates riveted to the cylinder at a point where the axle projects therefrom.

16. A convict cage comprising a metallic cylinder closed at the ends by gratings, in combination with the awnings attached to the ends of the cylinder exteriorly of the grating.

17. A convict cage comprising a metallic cylinder horizontally supported upon wheels, gratings closing the opposite ends of the cylinder, vertical standards located at an intermediate point of the cylinder and spaced apart to form an intermediate gangway and secured at their upper and lower ends to the inside of the cylinder, transverse bars extending from said standards to the adjacent inner face of the cylinder and secured at their ends to said standards and said cylinder, an axle passed transversely through the cage and connected to said standards, and wheels mounted upon the axle outside of said cylinder.

In testimony, that I claim the foregoing as my own, I have hereto affixed my signature in the presence of two witnesses.

DAVID FRANKLIN YOUNGBLOOD.

Witnesses:
I. K. TURNER,
J. C. BLACKWELL.